United States Patent [19]

Skriletz et al.

[11] 3,828,488

[45] Aug. 13, 1974

[54] METHOD OF MAINTAINING THE FLUID PERMEABILITY OF A FIRED ALUMINA, BALL CLAY AND TALC FLUID-RELEASE MOLD

[75] Inventors: Rudolph A. Skriletz, Marysville; Virgil D. Kendall, Springfield, both of Ohio

[73] Assignee: Wallace-Murray Corporation, New York, N.Y.

[22] Filed: May 15, 1973

[21] Appl. No.: 360,589

Related U.S. Application Data

[62] Division of Ser. No. 346,291, March 30, 1973.

[52] U.S. Cl. ................................. 51/319, 51/328
[51] Int. Cl. ........................... B24c 1/00, B24b 1/00
[58] Field of Search .............. 51/281 R, 319–321, 51/328, 324, 8; 425/100, 225, 229, 437, DIG. 50, DIG. 116; 264/133, 134, 168

[56] References Cited

UNITED STATES PATENTS

| | | | |
|---|---|---|---|
| 1,503,586 | 8/1924 | Hileman | 51/283 X |
| 3,214,792 | 11/1965 | Fassina | 425/100 |
| 3,248,762 | 5/1966 | Wagner | 164/168 |
| 3,465,481 | 9/1969 | Szwarcman | 51/324 |

*Primary Examiner*—Donald G. Kelly
*Attorney, Agent, or Firm*—Schuyler, Birch, Swindler, McKie & Beckett

[57] ABSTRACT

A method of maintaining the fluid permeability of a fired ceramic mold body comprising at least 70 percent alumina, up to 15 percent ball clay and up to 15 percent talc wherein accumulated colloidal material which clogs the surface of the mold face is removed by abrading the mold face. The preferred manner of carrying out the invention is to sandblast the mold face.

4 Claims, No Drawings

METHOD OF MAINTAINING THE FLUID PERMEABILITY OF A FIRED ALUMINA, BALL CLAY AND TALC FLUID-RELEASE MOLD

This application is a division of our co-pending application Ser. No. 346,291 filed Mar. 30, 1973 which discloses the subject matter of this application.

BACKGROUND OF THE INVENTION

The use of air-release press molding has been widely adopted in the ware forming industry. The process involves pressing a quantity of plastic clay between cooperating male and female molds or dies formed of porous, fluid-permeable material. In addition to shaping the ware, the pressing operation also substantially dewaters the clay by forcing excess water into the pores of the molds. Release of the shaped ware, which adheres to the mold faces, is accomplished without distorting or damaging the ware by applying fluid pressure to a conduit embedded in one of the mold bodies so that the fluid passes from the conduit, diffuses throughout the porous mold body and exits through the mold face as a uniform blanket shortly before the male and female die members are separated. The shaped clay ware adheres to the second mold or die which is transferred to a ware depositing station where fluid pressure is applied in a like manner to the second mold member, to complete the release of the formed article. This basic process is disclosed in U.S. Pat. Nos. 2,584,109 and 2,584,110.

The original air-release mold bodies were formed of high grade gypsum plaster or gypsum cement which was found to have nearly ideal porosity for proper fluid permeability. Perforated metal tubing or permeable woven tubing was cast in the plaster molds to provide the required fluid conduits. The gypsum materials, however, were of limited strength and hardness and consequently over the course of repeated pressing operations the faces of the molds would crack or gradually wear away until the molds became unusable and had to be replaced. Although the service life of gypsum molds varied depending on the characteristics of the plastic clay being pressed, the configuration of the molds, the applied force and other factors, the practical service life of gypsum molds was generally no more than about 1000 pressing operations. This necessitated relatively frequent replacement of the molds with the attendant disadvantages of expense for replacement molds, loss of production time, and non-uniformity of the produced ware due to slight differences between molds. Consequently, the ware forming industry searched for a substitute material for forming the molds which would have the required porosity characteristics closely approximating those of gypsum plaster and which would have a greater hardness enabling it to resist wear.

A crystalline bonded ceramic comprising at least 70 percent alumina, up to 15 percent ball clay and up to 15 percent talc fired to a point short of the theoretical density for the ceramic has been found to be a virtually ideal material. This material is disclosed in U.S. Pat. No. 3,384,499. The alumina, ball clay and talc composition, with or without additives, is formed into a slurry, cast and subsequently fired at a temperature ranging from 2,000°F to 2,350°F. The exact firing conditions are controlled to prevent the ceramic mold body from reaching its theoretical density, i.e., the maximum density that the material would achieve if fired to an essentially solid nonporous state.

As previously stated the porous mold bodies to which the invention is applicable are comprised of at least 70 percent alumina, no more than 15 percent talc and up to 15 percent ball clay. Unless otherwise specifically indicated, all percentages are in terms of weight percent. The components of the mold bodies are mixed together with water in a ball mill to form a slurry which is then cast by conventional techniques to form green mold bodies. Best structural strength and production economy are obtained when the mold bodies have a substantially uniform thickness of approximately one and one-half inches although the mold bodies may be made either thicker or thinner in appropriate circumstances. The cast green mold bodies are dried and thereafter fired to a point short of their theoretical density. The theoretical density is the density which the material would achieve if fired to an essentially solid, nonporous state. The density of the material and thus the porosity of the fired mold bodies depends not only on the composition, but also on the temperature and time of firing. The following experimental test data illustrates the effect of firing the temperature on the mold bodies.

A series of four test bodies were formed from a composition of alumina, ball clay and talc according to the invention. The test bodies were dried and then fired to various temperatures in a baffled kiln in which the heating rate was maintained at 87°F. per hour. After firing, the percent porosity, modulus of rupture and percent shrinkage were determined for each test body. The results are listed in Table I.

TABLE I

EFFECT OF VARIATIONS IN FIRING CONDITIONS

| Firing Temperature (degrees F.) | Percent Porosity (by volume) | Modulus of Rupture (p.s.i.) | Percent Shrinkage (length) |
|---|---|---|---|
| 2,100 | 39.5 | 7,500 | 1.0 |
| 2,220 | 35.0 | 9,700 | 3.0 |
| 2,340 | 28.0 | 10,900 | 4.5 |
| 2,380 | 23.0 | 11,000 | 7.0 |

The foregoing results show that as the firing temperature is increased, the porosity of the resulting mold body is decreased. The strength of the mold body in terms of its modulus of rupture increases as the firing temperature is increased and the shrinkage of the mold body during firing also increases with an increase in firing temperature. Generally, the effect of time of heating parallels that of temperature. Accordingly, by controlling these factors, it is possible to produce mold bodies having a controlled degree of porosity. Generally the porosity of the mold body should be at least about 25 percent and preferably about 38 percent. Increases in porosity are achieved only by sacrificing some of the strength of the body. The minimum required strength of the mold body depends on the parameters of the particular manufacturing operation in which it is to be used. Up to 5 percent of weight manganese dioxide may be added to the initial components of the mold body as a flux to enhance the strength of the fired body.

A deflocculent optionally may also be added to the casting slip to reduce the thixotropy and thin out the mixture so that the mixture may be cast more easily into the desired mold body configuration. DARVAN No. 7, a 25 percent polyelectrolyte solution industrial dispersing agent manufactured by the Polymers and Chemical Division of W. R. Grace and Co., Cambridge, Massachusetts and distributed by the R. T. Vanderbilt Company, Inc., New York, New York has been found to be a suitable agent for such purpose. It is also thought that the presence of the polyelectrolyte dispersing agent may help to facilitate release of the green alumina, ball clay and talc mold body from the form in which it is cast. The addition of a trace amount of barium carbonate to digest soluble salts has been found to further enhance to results obtained.

The rate of heating should be carefully controlled to achieve substantially uniform temperature conditions within the kiln in order to minimize checking, cracking and spalling of the fired mold bodies and to achieve the most uniform distribution of porosity throughout the mold bodies possible.

The firing is carried out by placing the dried, cast mold bodies in a kiln and heating the kiln to a maximum temperature lying in the range of from 2,200°F. to 2,350°F. Preferably the temperature of the kiln is raised at a rate of 40°F. per hour or less, until the temperature of approximately 2,000F. is achieved. Thereafter, the rate of heating is decreased preferably to approximately 12° or 13°F. per hour or less until the maximum temperature is achieved. Most preferably the maximum temperature will be approximately 2,250°F. The mold bodies are not "soaked", i.e., heated for a period of time at the maximum temperature; instead, the kiln heat is cut off when the maximum temperature is reached and the kiln is allowed to cool down over a period of approximately 24 to 36 hours. After the kiln has cooled to a temperature of approximately 300°F., it may be opened and the fired mold bodies removed. The dimensional shrinkage during firing is desirably maintained at less than approximately 1 percent so that the total shrinkage during drying and firing of the mold bodies is less than about 1½ percent. The reduced heating rate after the temperature in the kiln has reached approximately 2,000°F. is thought to minimize checking and cracking of the mold bodies.

EXAMPLE

An alumina, ball clay and talc casting slip was made by slurrying 300 pounds calcined alumina (325 mesh size or less), 13½ pounds talc and 18 pounds ball clay in approximately 95 pounds of water. 16½ pounds manganese dioxide was added as a strenghtening flux. 750 grams Vanderbilt V-gum T was included to serve as a temporary binder; 700 grams DARVAN No. 7 polyelectrolyte was added as a deflocculent, and 75 grams powdered barium carbonate was added as a digesting agent. After a uniform slurry had been obtained, a portion of the slip was cast into a series of test bars. The bars were dried, and two series of test bars were kiln fired. In each series, the firing kilns were heated at a rate of 25°F. per hour up to a temperature of approximately 2,000°F., and the heating rate thereafter was reduced to between 12 and 13 degrees per hour up to a final temperature of approximately 2,250°F. at which point the deformation of the pyrometric cones used to monitor the firing indicated completion of the firing. The kiln heat was then cut off and the kiln was allowed to cool gradually over a period of 24 hours. After the kiln had cooled to substantially ambient temperature the test bars were removed and the porosity and strength in terms of modulus of rupture were determined for each bar. Sample bars checked for shrinkage were all within the 1½ percent limit. The results of the tests are summarized in Table II below.

TABLE II

| Test Series & Bar No. | Modulus of Rupture (p.s.i.) | Porosity (% volume) |
|---|---|---|
| I-1 | 8150 | 39.8 |
| I-2 | 3590 | 41.0 |
| I-3 | 5380 | 40.3 |
| I-4 | 5220 | 39.5 |
| I-5 | 8450 | 41.6 |
| I-6 | 4000 | 41.3 |
| Series Average | 5800 | 40.6 |
| II-1 | 6280 | 42.2 |
| II-2 | 5900 | 41.5 |
| II-3 | 2100* | 39.5 |
| II-4 | 4800 | 40.6 |
| II-5 | 8320 | 41.4 |
| II-6 | 4280 | 41.2 |
| Series Average | 5920 | 41.1 |
| Overall Average | 5850 | 40.8 |

* Low strength due to flow in casting; excluded from calculation of averages.

As can be seen from the table, the sample composition consistently provided test bodies with acceptable porosity and strength characteristics.

Further details about a preferred construction of such molds are explained in our co-pending application Ser. No. 346,291 filed Mar. 30, 1973 the entire disclosure of which is hereby incorporated in this specification by reference.

Porous fluid-release molds and dies formed from the new alumina, ball clay and talc material have vastly superior tensile strength, hardness, and wear resisting properties. Whereas a fluid-release, porous mold of gypsum material had a useful service life of approximately 1,000 pressing operations, molds and dies formed of the new material were capable of resisting wear and breakage and had a potential useful service life of literally tens of thousands of pressing operations.

In actual operation it was found, however, that the fluid permeability of molds or dies formed of the new alumina, ball clay and talc material progressively decreased so that after two or three thousand pressing operations, the molds become effectively useless because they would no longer conduct sufficient fluid to effect a smooth release of the ware from the mold faces. After extensive research over a period of years, the problem was found to arise from the gradual accumulation in the pores of the mold body of residues from the consumption of the combustible tubing which was molded in the interior of the green mold bodies as they were cast and then burned out during the firing to form the conduit in the interior of the mold body through which the release fluid was applied. Once the source of this problem was discovered, it was solved by omitting the combustible tube from the mold body, and after firing of the mold body attaching a fluid-permeable conduit to the exterior of the mold body and sealing the non-communicating portions of the fluid permeable tube and the mold body so that fluid from the tube was constrained to pass into the porous mold body and exit therefrom through the mold face.

Once the problem of decrease in fluid permeability of the mold bodies due to the accumulation of residues from the combustible tubing was solved by mounting the fluid permeable conduit on the back of the mold body, it became possible to obtain more than about three thousand or so pressings from a mold. However, upon continued use of the molds the fluid permeability was found to decrease again after approximately five thousand pressings so that between five and ten thousand pressings the molds again became unusable. Inspection of mold faces revealed that the surface of the ceramic mold body, which normally is light tan in color, had turned dark brown. It was determined that the source of this problem was the accumulation of colloidal material from the clay on the surface of the mold face of the mold body. The composition of the plastic clay pressed in the molds was varied in an attempt to prevent this surface deposition. Also, the mold face was soaked or washed with several types of acid or caustic alkaline solutions in an attempt to dissolve the surface accumulation. None of these efforts proved entirely satisfactory. Because of the accumulation of colloidal material which fouled and clogged the surface openings on the mold face of the porous mold body, sufficient fluid could not be diffused through the mold body to effect a smooth release of the formed clay article from the entire mold face. Consequently, the new molds had to be replaced after about five thousand pressing operations even though the mold faces were not appreciably worn or broken. Because the expense of preparing the fired ceramic mold bodies of alumina, ball clay and talc is substantially greater than the cost of preparing conventional fluid-release mold bodies of gypsum plaster, the expected economic advantage of the fired ceramic molds due to their high tensile strength, hardness and wear resistance was limited by this clogging problem.

SUMMARY OF THE INVENTION

It is an object of this invention to provide a method for maintaining the fluid permeability of a crystalline bonded, fired ceramic fluid-release mold which enables full utilization of the strength and wear resistance of the fired ceramic mold bodies.

It is a further object of this invention to provide a method for maintaining the fluid permeability of a crystalline bonded, fired ceramic fluid-release mold comprising at least 70 percent alumina, up to 15 percent ball clay and up to 15 percent talc which makes it possible to obtain up to fifty thousand or more pressings from a single mold set.

These and other objects of the invention are achieved by removing the accumulation of colloidal material from the surface of the mold face of the mold body by abrading the mold face.

BRIEF DESCRIPTION OF THE INVENTION

Briefly described, the invention is a method of maintaining the fluid permeability of a fired ceramic fluid-release mold body comprising at least 70 percent alumina, up to 15 percent ball clay and up to 15 percent talc and having a mold face formed on at least one surface thereof wherein accumulated colloidal material is removed from the mold face of the mold body by abrading the surface of the mold face.

DESCRIPTION OF THE PREFERRED EMBODIMENT

Applicants have found that the fired alumina, ball clay and talc mold bodies are sufficiently hard that they are not readily destroyed by abrasion and that when the surface of the mold face is abraded, the accumulation of colloidal material from the clay on the surface of the mold face of the mold body is effectively removed so that the fluid permeability of the mold bodies is fully restored and the molds are again usable. The preferred manner of removing this accumulation is to carefully sandblast the mold face. It is also possible to remove the surface accumulation by carefully sanding the mold face with find sandpaper.

After treated mold bodies had been used for an additional five to ten thousand pressing operations, the dirty brown accumulation of colloidal material from the clay reappeared and the fluid permeability again decreased until the molds were unusable. This second accumulation of colloidal material from the clay can also be effectively removed by abrading the mold face of the mold body in the same manner. Experience has demonstrated that the mechanical abrasion of the mold face to remove such colloidal accumulations may be repeated up to from six to ten times before the surface of the mold face is worn away to such an extent that the mold must be discarded due to destruction of the mold design or due to the dimensional tolerances for the produced ware being exceeded. The exact number of times which the abrasion process may be repeated before the mold must be discarded naturally depends on the fineness of the detail of the mold design and the precision of the dimensional tolerances for the ware which is to be produced by the mold.

Accordingly, by utilizing the method of the invention to remove the colloidal accumulation from the surface of the mold face, it is possible to obtain up to fifty thousand or more pressings from a single mold set. In fact, one test mold has repeatedly been successfully rehabilitated by using the method of the invention so that the mold was successfully used for more than sixty-seven thousand pressings without permanent loss of porosity. It can therefore readily be seen that the instant invention facilitates a substantial increase in the number of shaped clay articles which may be formed with a single mold set thereby making possible a more rapid and economical production of press molded clay wear.

Modifications of the invention will undoubtedly occur to those skilled in the art; therefore, the scope of the invention is to be limited solely by the scope of the appended claims.

We claim:

1. A method of maintaining the fluid permeability of a fired, ceramic fluid-release mold body comprising at least 70 percent alumina, up to 15 percent ball clay and up to 15 percent talc; said mold body having a porous mold face formed thereon; said method comprising removing accumulated colloidal material from the pores of the mold face of the mold body by abrading the surface of the mold face after from 5,000 to 10,000 pressing operations to achieve controlled erosion of the mold face without destroying the mold design or exceeding the dimensional tolerances of the mold.

2. A method as recited in claim 1 wherein the abrading of the mold face is accomplished by sanding the mold face with fine sandpaper.

3. A method as recited in claim 1 wherein the abrading of the mold face is accomplished by sandblasting the mold face.

4. A method as recited in claim 1 wherein the abrading of the mold face is repeated after additional intervals of from 5,000 to 10,000 pressing operations to remove successive accumulations of colloidal material from the pores of the mold face of the mold body.

* * * * *